(12) United States Patent
Miyasaka et al.

(10) Patent No.: US 7,848,931 B2
(45) Date of Patent: Dec. 7, 2010

(54) AUDIO ENCODER

(75) Inventors: Shuji Miyasaka, Osaka (JP); Yoshiaki Takagi, Kanagawa (JP); Naoya Tanaka, Osaka (JP); Mineo Tsushima, Nara (JP)

(73) Assignee: Panasonic Corporation, Osaka (JP)

( * ) Notice: Subject to any disclaimer, the term of this patent is extended or adjusted under 35 U.S.C. 154(b) by 969 days.

(21) Appl. No.: 11/659,949

(22) PCT Filed: Aug. 18, 2005

(86) PCT No.: PCT/JP2005/015083

§ 371 (c)(1),
(2), (4) Date: Feb. 12, 2007

(87) PCT Pub. No.: WO2006/022190

PCT Pub. Date: Mar. 2, 2006

(65) Prior Publication Data
US 2007/0271095 A1    Nov. 22, 2007

(30) Foreign Application Priority Data
Aug. 27, 2004    (JP)    ............... 2004-248990

(51) Int. Cl.
*G10L 19/00*    (2006.01)
(52) U.S. Cl. .................. 704/500; 704/501; 704/504
(58) Field of Classification Search .............. 704/200.1, 704/200, 201, 203, 205, 219, 220, 222, 223, 704/225, 500–504, 230
See application file for complete search history.

(56) References Cited

U.S. PATENT DOCUMENTS 5,956,674 A * 9/1999 Smyth et al. ............ 704/200.1

(Continued)

FOREIGN PATENT DOCUMENTS

JP        2001-306097        11/2001

(Continued)

OTHER PUBLICATIONS

C. Faller et al. "*Binaural Cue Coding-Part II: Schemes and Applications*", IEEE Trans. on Speech and Audio Processing, 2003, vol. 11, No. 6, pp. 520-531.

(Continued)

*Primary Examiner*—Huyen X. Vo
(74) *Attorney, Agent, or Firm*—Wenderoth, Lind & Ponack, L.L.P.

(57) ABSTRACT

An audio encoder, which is capable of encoding multiple-channel signals so that only a downmixed signal is decoded and of further generating specific auxiliary information necessary for dividing the downmixed signal, is provided.

An audio encoder (10), which compresses and encodes audio signals of N-channels (N>1), includes a downmixed signal encoding unit (11) which encodes the downmixed signal obtained by downmixing the audio signals, and an auxiliary information generation unit (12a) which generates auxiliary information necessary for decoding the downmixed signal encoded by the downmixed signal encoding unit (11) into N-channel audio signals. The auxiliary information generation unit (12a) includes transformation units (121) and (122) which transform audio signals respectively into frequency domain signals, a detection unit (123) which detects phase difference information and gain ratio information each indicates a degree of difference between frequency domain signals, and a quantization unit (125) which quantizes, for each frequency band, the phase difference information and gain ratio information detected by the detection unit (123) using the quantization precision setting table (124). The quantization precision setting table (124) functions as a division unit which divides a frequency band of a frequency domain signal into plural sub-bands.

21 Claims, 14 Drawing Sheets

U.S. PATENT DOCUMENTS 7,627,480 B2 * 12/2009 Ojanpera .................... 704/500
2003/0236583 A1 12/2003 Baumgarte et al.

FOREIGN PATENT DOCUMENTS

| JP | 2004-78183 | 3/2004 |
|---|---|---|
| WO | 03/090208 | 10/2003 |

OTHER PUBLICATIONS

*Text of ISO/IEC 14496-3:2001/FDAM2 (Parametric Coding for High Quality Audio)*, Dec. 2003, pp. iii-116.

* cited by examiner

FIG. 5

| Band number | Quantization bit rate |
|---|---|
| 0 | 6 |
| 1 | 5 |
| 2 | 4 |
| 3 | 4 |
| ⋮ | ⋮ |
| M-1 | 1 |
| M | 1 |

FIG. 9

| Band number | Start frequency (kHz) | End frequency (kHz) |
| --- | --- | --- |
| 0 | 0.000000 | 0.086133 |
| 1 | 0.086133 | 0.172266 |
| 2 | 0.172266 | 0.258398 |
| 3 | 0.258398 | 0.344531 |
| 4 | 0.344531 | 0.430664 |
| 5 | 0.430664 | 0.516797 |
| 6 | 0.516797 | 0.602930 |
| 7 | 0.602930 | 0.689063 |
| 8 | 0.689062 | 0.775195 |
| 9 | 0.775195 | 0.861328 |
| 10 | 0.861328 | 1.033594 |
| 11 | 1.033594 | 1.378125 |
| 12 | 1.378125 | 1.722656 |
| 13 | 1.722656 | 2.067188 |
| 14 | 2.067188 | 3.100781 |
| 15 | 3.100781 | 4.651172 |
| 16 | 4.651172 | 6.890625 |
| 17 | 6.890625 | 9.646875 |
| 18 | 9.646875 | 12.403125 |
| 19 | 12.403125 | 15.159375 |
| 20 | 15.159375 | 17.915625 |
| 21 | 17.915625 | 22.050000 |

FIG. 10

| Band number | Start frequency (kHz) | End frequency (kHz) |
|---|---|---|
| 0 | 0.000000 | 0.086133 |
| 1 | 0.086133 | 0.172266 |
| 2 | 0.172266 | 0.258398 |
| 3 | 0.258398 | 0.344531 |
| 4 | 0.344531 | 0.430664 |
| 5 | 0.430664 | 0.516797 |
| 6 | 0.516797 | 0.602930 |
| 7 | 0.602930 | 0.689063 |
| 8 | 0.689062 | 0.775195 |
| 9 | 0.775195 | 0.861328 |
| 10 | 0.861328 | 1.033594 |
| 11 | 1.033594 | 1.378125 |
| 12 | 1.378125 | 1.722656 |
| 13 | 1.722656 | 2.067188 |
| 14 | 2.067188 | 3.100781 |
| 15 | 3.100781 | 4.651172 |
| 16 | 4.651172 | 9.646875 |
| 17 | 9.646875 | 15.159375 |
| 18 | 15.159375 | 22.050000 |

FIG. 11

| Gain ratio information | | Phase difference information | |
|---|---|---|---|
| Band number | Quantization bit rate | Band number | Quantization bit rate |
| 0 | 5 | 0 | 5 |
| 1 | 5 | 1 | 5 |
| 2 | 5 | 2 | 4 |
| 3 | 5 | 3 | 4 |
| 4 | 5 | 4 | 4 |
| 5 | 5 | 5 | 3 |
| 6 | 5 | 6 | 3 |
| 7 | 5 | 7 | 3 |
| 8 | 4 | 8 | 3 |
| 9 | 4 | 9 | 3 |
| 10 | 4 | 10 | 3 |
| 11 | 4 | 11 | 3 |
| 12 | 4 | 12 | 3 |
| 13 | 4 | 13 | 3 |
| 14 | 4 | 14 | 2 |
| 15 | 4 | 15 | 2 |
| 16 | 4 | 16 | 2 |
| 17 | 4 | | |
| 18 | 3 | 17 | 2 |
| 19 | 3 | | |
| 20 | 3 | 18 | 2 |
| 21 | 3 | | |

FIG. 12

| Band number | Start frequency (kHz) | End frequency (kHz) |
|---|---|---|
| 0 | 0.000000 | 0.150266 |
| 1 | 0.150266 | 0.258398 |
| 2 | 0.258398 | 0.344531 |
| 3 | 0.344531 | 0.430664 |
| 4 | 0.430664 | 0.516797 |
| 5 | 0.516797 | 0.602930 |
| 6 | 0.602930 | 0.689063 |
| 7 | 0.689062 | 0.861328 |
| 8 | 0.861328 | 1.033594 |
| 9 | 1.033594 | 1.378125 |
| 10 | 1.378125 | 1.722656 |
| 11 | 1.722656 | 2.067188 |
| 12 | 2.067188 | 4.651172 |
| 13 | 4.651172 | 9.646875 |
| 14 | 9.646875 | 15.159375 |
| 15 | 15.159375 | 22.050000 |

FIG. 13

| Band number | Start frequency (kHz) | End frequency (kHz) |
|---|---|---|
| 0 | 0.000000 | 0.150266 |
| 1 | 0.150266 | 0.258398 |
| 2 | 0.258398 | 0.344531 |
| 3 | 0.344531 | 0.430664 |
| 4 | 0.430664 | 0.516797 |
| 5 | 0.516797 | 0.602930 |
| 6 | 0.602930 | 0.689063 |
| 7 | 0.689062 | 0.861328 |
| 8 | 0.861328 | 1.378125 |
| 9 | 1.378125 | 2.067188 |
| 10 | 2.067188 | 4.651172 |
| 11 | 4.651172 | 9.646875 |
| 12 | 9.646875 | 15.159375 |
| 13 | 15.159375 | 22.050000 | ers includes one or more inter-channel level differences and inter-channel time differences, but does not disclose how such information (auxiliary information) is specifically quantized and compressed.

AUDIO ENCODER

TECHNICAL FIELD

The present invention relates to an audio encoder which encodes multiple-channel signals of at least two or more channels. In particular, it relates to a technique of specifically generating auxiliary information necessary for dividing a downmixed signal, which is obtained by downmixing the multi-channel signals, into original multiple-channel signals.

BACKGROUND ART

In recent years, the development of the technique of Spatial Codec has been encouraged. This technique aims at compressing and coding multiple-channels with a very small amount of information while maintaining a sense of realism of sounds from the multi-channels.

For example, a bit rate of 512 kbps or 384 kbps is required for 5.1 channel sound by the AAC format which is a multi-channel codec that has been widely used as an audio method used for digital televisions. In contrast, Spatial Codec aims at compressing and encoding multiple-channel signals at a very small bit rate such as 128 kbps, 64 kbps, or further still, at 48 kbps. For example, Patent Reference 1 describes a technology for realizing the above.

According to Patent Reference 1, the sense of realism is maintained by compressing and encoding a ratio of levels between channels (hereinafter referred to as "level difference" and "gain ratio").

More specifically, in binaural cue coding (BCC), spectral components of an input signal are downmixed so as to generate a BCC parameter (for example, an inter-channel level and/or time difference). When implementing the generated BCC parameter in stereo, bilateral-channel signals are transformed into signals in a frequency domain and the spectral components of a pair of the bilateral-channel signals are then downmixed into mono components. After that, these mono components and spectral components of the bilateral-channel signals which have not been downmixed are inversely transformed into signals in a temporal domain so as to generate a hybrid stereo signal, and the hybrid stereo signal is encoded using conventional coding techniques. The encoded bit stream is decoded by conventional decoding techniques and reproduced. Next, an auditory scene is synthesized based on the mono components and stereo components that have not been downmixed, by applying the BCC parameter using the BCC synchronization method.

Therefore, when actually viewing and listening using a home AV device and so on, an encoded downmixed signal is divided using auxiliary information so that signals can be divided to an extent in which there is still no auditory sense of discomfort. In addition, in the case of easy listening through headphones of a cellular phone and the like, only a downmixed signal alone needs to be decoded without using a BCC parameter so that signals can be reproduced in good sound quality with easy and fewer calculations, which cannot be realized by the conventional compression methods.

Patent Reference 1: United States Patent No. 2003/0236583A1 (which corresponds to Japanese Laid-Open Patent Application No. 2004-78183)

DISCLOSURE OF INVENTION

Problems that Invention is to Solve

However, Patent Reference 1 only discloses that one or more BCC parameters is generated for one or more downmixed spectral components and that the one or more BCC parameters includes one or more inter-channel level differences and inter-channel time differences, but does not disclose how such information (auxiliary information) is specifically quantized and compressed.

Accordingly, there is a demand for specific techniques for creating auxiliary information.

In light of the consideration, the present invention has an object of providing an audio encoder which is capable of encoding multiple-channels so that a downmixed signal alone is to be decoded and of specifically creating auxiliary information necessary for dividing the downmixed signal.

Means to Solve the Problems

In order to achieve the aforementioned object, the audio encoder according to the present invention is an audio encoder which compresses and encodes audio signals of N channels, where N>1, the audio encoder including: a downmixed signal encoding unit which encodes a downmixed signal obtained by downmixing the audio signals; and an auxiliary information generation unit which generates auxiliary information which is necessary for decoding the downmixed signal encoded by the downmixed signal encoding unit into the audio signals of the N channels, wherein the auxiliary information generation unit includes: a transformation unit which transforms each audio signal into a frequency domain signal; a division unit which divides a frequency band of the signal in the frequency domain into plural sub-bands; a detection unit which detects phase difference information and gain ratio information that each indicate a degree of difference between the frequency domain signals; and a quantization unit which quantizes, for each sub-band, the phase difference information and gain ratio information that are detected by the detection unit.

It should be noted that the present invention can be realized not only as such an audio encoder, but also as an encoding method including the characteristic units of the audio encoder as steps, and as a program for causing a computer to execute the steps. Also, the characteristic units of the audio encoder can be integrated as an LSI. It is obvious that such a program can be distributed on a recording medium such as a CD-ROM or via a transmission medium such as the Internet.

EFFECTS OF THE INVENTION

As is clear from the above-mentioned description, the audio encoder of the present invention can encode multiple-channels so that a downmixed signal alone is to be decoded and can specifically create auxiliary information necessary for dividing the downmixed signal.

Accordingly, the present invention can realize an easy reproduction of good sound quality, so that the practical value of the present invention is very high today when easy music reproduction on mobile devices such as cellular phones and full-scaled music reproduction on AV devices are developed.

BRIEF DESCRIPTION OF DRAWINGS

FIG. 5 is a diagram which shows an example of a quantization precision setting table 124.

FIG. 6 are diagrams which explain a comparison between the conventional art and the present invention. In particular.

FIG. 9 is a diagram which shows an example of a frequency division table 1271 with respect to gain ratio information.

FIG. 10 is a diagram which shows an example of a frequency division table 1272 with respect to phase difference information.

FIG. 11 is a diagram which shows an example of a quantization precision table 1281 in which a quantization precision for the gain ratio information and a quantization precision for the phase difference information are separately set.

FIG. 12 is a diagram which shows an example of a frequency division table with respect to gain ratio information in a low bit rate operation mode.

FIG. 13 is a diagram which shows an example of a frequency division table with respect to phase difference information in a low bit rate operation mode.

FIG. 14 are diagrams which explain characteristics of the present invention. In particular.

NUMERICAL REFERENCES

Figure 1:
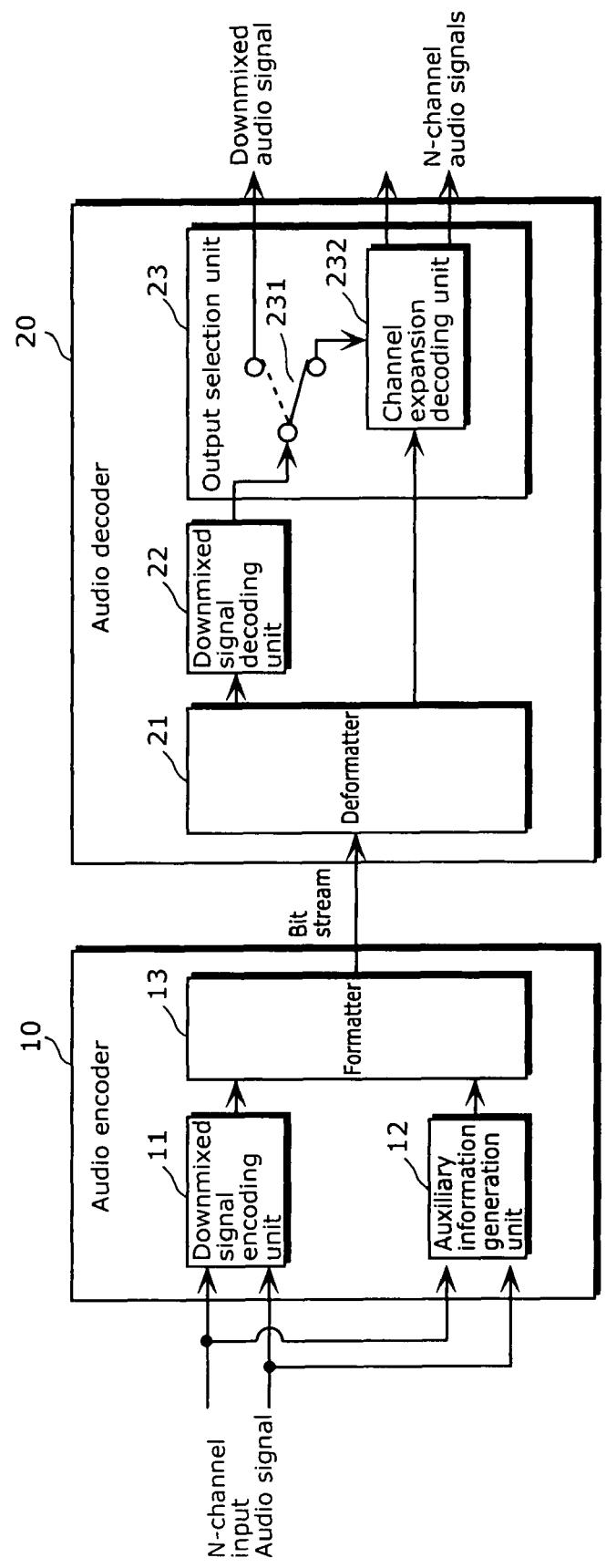
FIG. 1 is a block diagram which shows a whole configuration of an audio signal encoding/decoding system to which an audio encoder of the present invention is adopted.

10 Audio encoder
11 Downmixed signal encoding unit
12 Auxiliary information generation unit
13 Formatter
121 First transformation unit
122 Second transformation unit
123 Detection unit
124 Quantization precision setting table
125 Quantization unit
126 Compression unit
127a First division unit
127b Second division unit
127c Third division unit
127d Fourth division unit
128a First quantization unit
128b Second quantization unit
1271 Frequency division table
1272 Frequency division table
1281 Quantization precision table

BEST MODE FOR CARRYING OUT THE INVENTION

Hereinafter, an audio signal encoding/decoding system in which an audio encoder of the present invention is adopted is described.

First Embodiment

FIG. 1 is a block diagram which shows a whole configuration of the audio signal encoding/decoding system including the audio encoder of the present invention.

As shown in FIG. 1, the audio signal encoding/decoding system 1 includes an audio encoder 10 which compresses and encodes audio signals of N channels (N>1), and an audio decoder 20 which decodes the audio signals compressed and encoded by the audio encoder. Note that, for the sake of explanation, FIG. 1 shows the case of encoding two-channel audio signals.

The audio encoder 10 includes a downmixed signal encoding unit 11 which encodes a downmixed signal obtained by downmixing two-channel input audio signals, an auxiliary information generation unit 12 which generates auxiliary information (a level ratio, a phase difference) necessary for decoding the downmixed signal encoded by the downmixed signal encoding unit 11 into N-channel audio signals, and a formatter 13 which generates a bit stream by connecting, for each predetermined frame, the downmixed signal encoded by the downmixed signal encoding unit 11 to the auxiliary information generated by the auxiliary information generation unit 12 and outputs the generated bit stream to the audio decoder 20.

Figure 2:
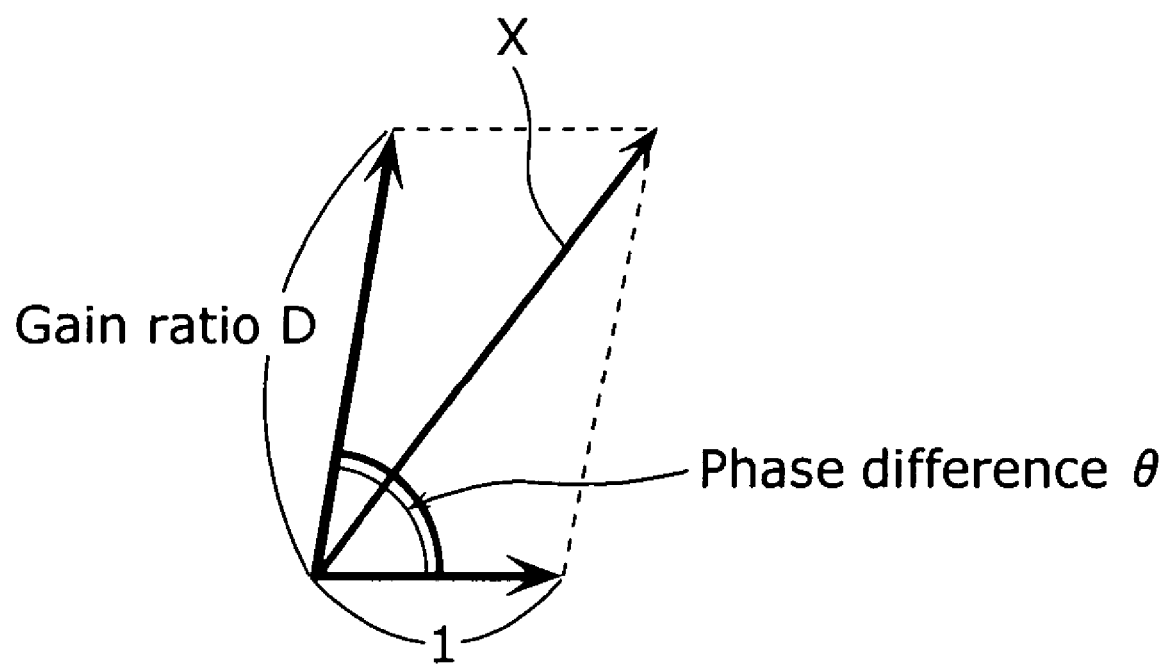
FIG. 2 is a diagram which shows a relationship on a frequency axis between two-channel audio signals and a downmixed signal with respect to a gain ratio and a phase difference.

For example, in the case where the two-channel input audio signals are two vectors shown in FIG. 2, the downmixed signal encoding unit 11 synthesizes, as a downmixed signal, the two vectors into a vector indicated as X. Note that, in FIG. 2, one of the two-channel input audio signals is normalized to have its absolute value of 1, and the other is normalized at the level ratio D. The auxiliary information generation unit 12 detects a level ratio D and phase difference θ of the two-channel input audio signals, and quantizes the detected level ratio D and phase difference θ for each frequency band. Note that, the detailed configuration of the auxiliary information generation unit 12 shall be described later. The formatter 13 connects the downmixed signal to the auxiliary information for each predetermined frame, and generates a bit stream.

Figure 3:
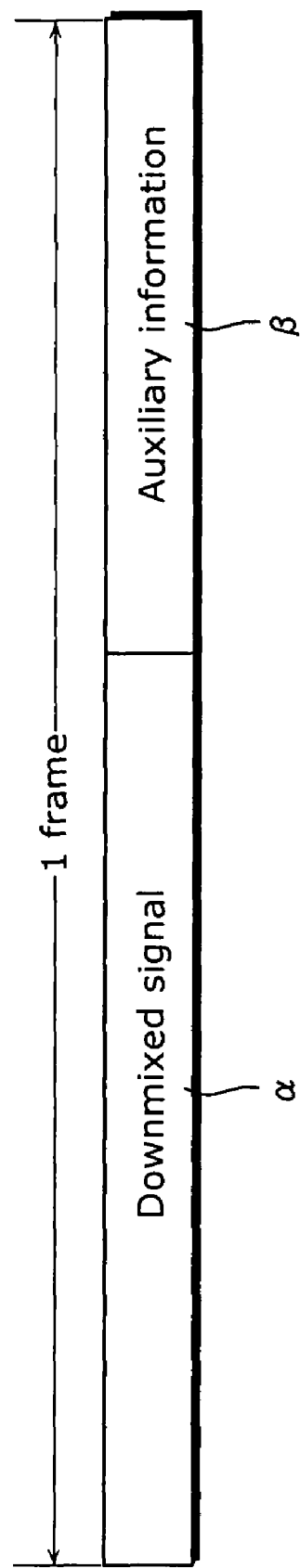
FIG. 3 is a diagram showing a format configuration of a bit stream outputted by the audio encoder 10.

FIG. 3 is a diagram which shows a format configuration of the bit stream. Here, FIG. 3 shows only an example for one frame.

In the bit stream, a region α and a region β are sequentially placed for each of the frames positioned at predetermined time intervals. The region α holds the encoded downmixed signal and the region β holds the auxiliary information.

In FIG. 3, correspondence data which corresponds to the first frame is respectively stored into the regions α and β. The same configuration is repeatedly applied to the second frame.

It is assumed that the region α holds, for example, a downmixed signal which is a downmixed signal obtained by compressing and encoding the downmixed signal, which is obtained by downmixing two-channel signals, by the MPEG AAC format. Here, downmixing is the process of synthesizing signals into a vector.

The region β holds auxiliary information which includes a value indicating a gain ratio D between the two-channel audio signals and a value indicating a phase difference θ between the two-channel audio signals. Here, it should be noted that the value indicating the phase difference θ does not need to be the value obtained by directly encoding the phase difference θ. For example, it may be data obtained by encoding a value such as cos θ. In that case, the phase difference θ within a range from 0° to 180° may be indicated by the value of cos θ.

Return to FIG. 1, the audio decoder 20 includes a deformatter 21 which divides, for each frame, the encoded downmixed signal and the auxiliary information, from the bit stream received from the audio encoder 10, a downmixed signal decoding unit 22 which decodes the encoded downmixed signal which is divided by the deformatter 21, and an output selection unit 23 which outputs one of the downmixed audio signal and N-channel audio signals. The output selection unit 23 includes an output destination selection switch 231 and a channel expansion decoding unit 232.

In the case where the audio decoder 20 is a mobile device such as a cellular phone so that reproduction is carried out easily through headphones, a downmixed signal decoded by the downmixed signal decoding unit 22 is directly outputted by the output destination selection switch 231.

In contrast, in the case where a full-scaled reproduction is performed by an AV device or the like, the downmixed signal decoded by the downmixed signal decoding unit 22 is outputted to the channel expansion decoding unit 232 by the output destination selection switch 231. The channel expansion decoding unit 232 performs an inversion quantization which is an inversion process of the process performed by the auxiliary information generation unit 12, and decodes the level ratio and the phase difference. After that, it performs a process which is an inversion process of the process shown in FIG. 2 with respect to the input of the output destination selection switch 231, in other words, obtains a rhombus whose diagonal line corresponds to the downmixed signal and vertex indicates the phase difference θ, on the frequency axis. Consequently, music is reproduced with high quality and an increased sense of realism, by dividing the downmixed signal into two-channel audio signals, and transforming the divided audio signal from the frequency axis into the temporal axis.

Hereinafter, the auxiliary information generation unit according to the first embodiment of the present invention shall be described with reference to the diagrams.

Figure 4:
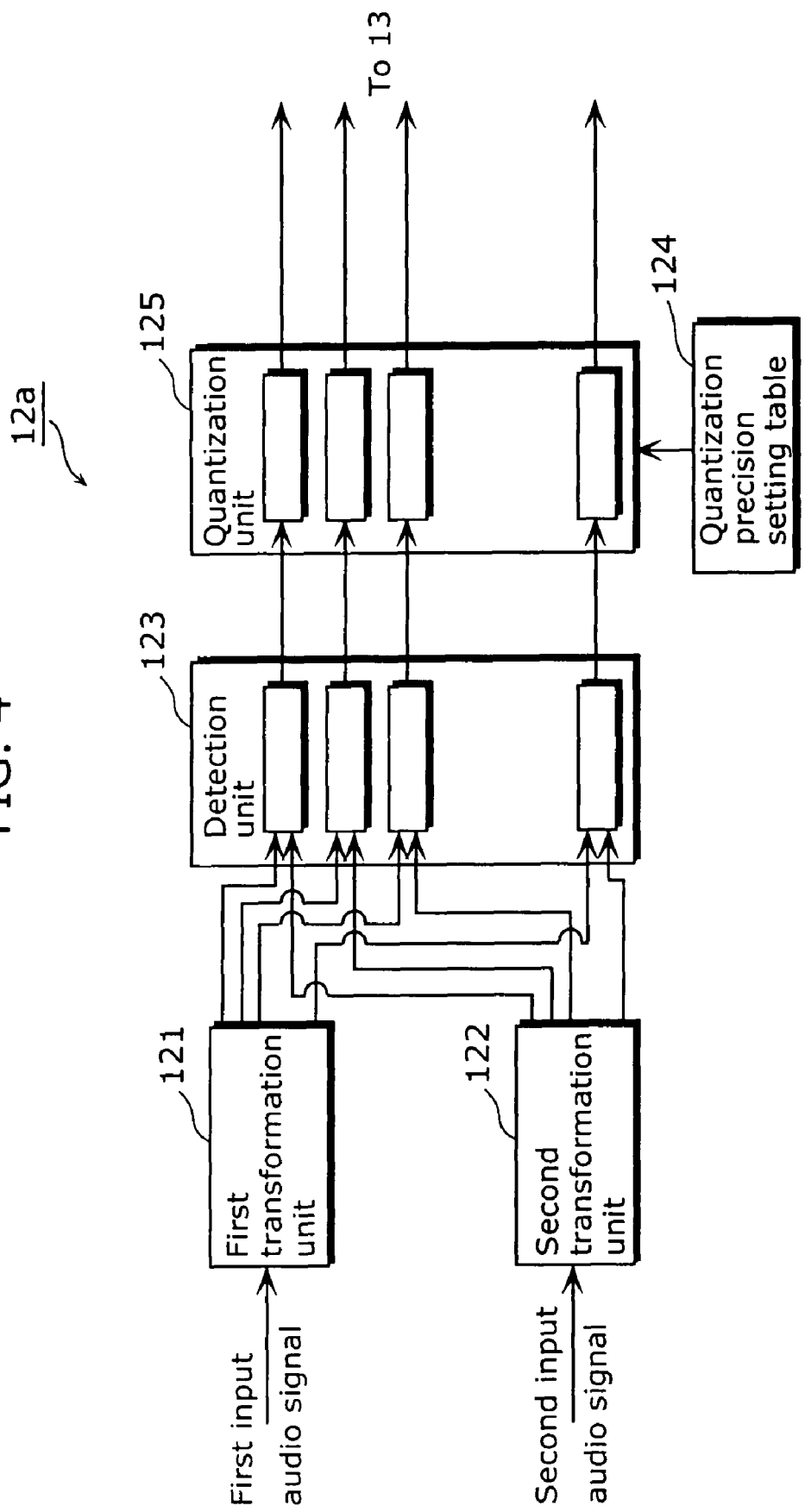
FIG. 4 is a block diagram which shows a detailed configuration of an auxiliary information generation unit shown in FIG. 1.

FIG. 4 is a block diagram which shows a detailed configuration of an auxiliary information generation unit shown in FIG. 1. As shown in FIG. 4, the auxiliary information generation unit 12a includes a first transformation unit 121, a second transformation unit 122, a detection unit 123, a quantization unit 125, and a quantized precision setting table 124.

The first transformation unit 121 transforms the first input audio signal into a frequency band signal.

The second transformation unit 122 transforms the second input audio signal into a frequency band signal.

The detection unit 123 detects a degree of difference between frequency band signals corresponding to the first input audio signal and the second input audio signal.

The quantization precision setting table 124 sets, for each frequency band, a precision for quantization to be performed by the quantization unit 125.

The quantization unit 125 quantizes the degree of difference for each detected frequency band.

The following describes the operations of the above-mentioned auxiliary information generation unit 12a.

First, the first transformation unit 121 transforms the first input audio signal into plural frequency band signals. This transformation may be a method of transforming the input audio signals into frequency spectral signals so as to generate a predetermined frequency band signal by grouping some of the spectral signals, using a Fourier transformation, Cosine transformation, or the like. For example, the method may be transforming the input audio signals into 1024 frequency spectral signals, grouping the four frequency spectral signals from the lowest frequency out of the 1024 frequency spectral signals as a first frequency band signal, and grouping the following four frequency band signals as a second frequency band signal. Here, the number of frequency spectral signals to be grouped as a frequency band signal may be increased as higher the frequencies. Also, the frequency band signal may be obtained using a QMF filter bank and the like.

Next, the second transformation unit 122 transforms the second input audio signal into plural frequency band signals. This transformation method is the same as the transformation method used by the first transformation unit 121.

Next, the detection unit 123 detects a degree of difference between frequency band signals corresponding to the first input audio signal and the second input audio signal. For example, it detects a level difference and a phase difference between the corresponding frequency band signals.

The method of detecting a level difference includes methods of comparing maximum values of amplitudes, and of comparing energy levels, for respective bands.

The method of detecting a phase difference includes methods of obtaining a phase angle from a real number value and an imaginary number value of Fourier series, and of obtaining a phase difference from a correlation value of corresponding band signals. Specifically, when the correlation value is C (C is within a range of ±1.0), the phase angle is obtained as $\pi*(1-C)/2$.

Finally, the quantization unit 125 quantizes the degree of difference for each detected frequency band. Here, the degree of precision for the quantization of each band is previously determined by the quantization precision setting table 124.

FIG. 5 is a diagram which shows an example of the quantization precision setting table 124.

In FIG. 5, it is indicated that 6 bits are assigned as a quantization bit rate for the lowest frequency band. The precision for quantization is determined for each frequency band. For example, 5 bits and 4 bits are respectively assigned to subsequent frequency bands in ascending order from the lowest frequency band. Thus, a higher quantization precision is determined for a lower frequency band. For example, one bit is assigned to the frequency band of the highest precision for the quantization. Here, it is obvious that the values are only the examples and other values may be used. Furthermore, the precision for quantization may be changed not in order of frequency bands but in accordance with the characteristics of auditory sensitivity. Thus, the quantization unit 125 quantizes the signal of each frequency band at the quantization precision determined by the quantization precision setting table 124.

Whereas it has been described, in order to simplify the explanation, that the precision for quantization is previously determined for each frequency band by the table, it is obvious that the determination is not the prerequisite. In other words, the method may be adaptively determining a coarseness of quantization in the frequency band in accordance with the input signal, and encoding the information indicating the coarseness of the quantization. In that case, the coarseness of quantization is desired to be expressed by two steps so as to decrease the size of the encoded signal in the information indicating the coarseness.

As described in the above, in the first embodiment, the auxiliary information generation unit 12a includes the first transformation unit 121 which transforms audio signals of N-channels (N>1) respectively into frequency band signals, the second transformation unit 122, the detection unit 123 which detects a degree of difference between the frequency band signals corresponding to the N-channel audio signals, and the quantization unit 125 which quantizes the degree of difference detected for each frequency band. The precision for quantization to be performed by the quantization unit 125 may be determined for each frequency band so that the audio signals can be encoded in high sound quality at a low bit rate.

There are widely-used compression methods which embodies partially a technique of encoding a phase difference and level difference between channels. For example, the AAC format (ISO/IEC13818-7) embodies a technology called Intensity Stereo. Therefore, such technology may be used.

The Intensity Stereo in the MPEG standard AAC format (ISO/IEC13818-7) discloses that the level difference between channels is quantized at a quantization precision of the value of 256 for each of the plural frequency bands, and the difference value between adjacent frequency bands is compressed by Huffman coding.

However, in that method, quantization is performed at high precision of 256 for every one of the frequency bands so that a wasteful amount of information is used. Since the human auditory characteristics have a different sensitivity for each frequency band, bands in which quantization is to be performed at a high quantization precision and bands in which quantization at a low quantization precision can be performed without causing any effect should be separately controlled. Therefore, if quantization is performed at the value of 256 in each frequency band, the wasteful amount of information is used.

Furthermore, Intensity Stereo under MPEG AAC format (ISO/IEC13818-7) allows quantization in each of plural frequency bands using only two quantization precisions, resulting in phase difference of 0° or 180°, so that control in accordance with auditory sensitivity cannot be performed.

Figure 6A:
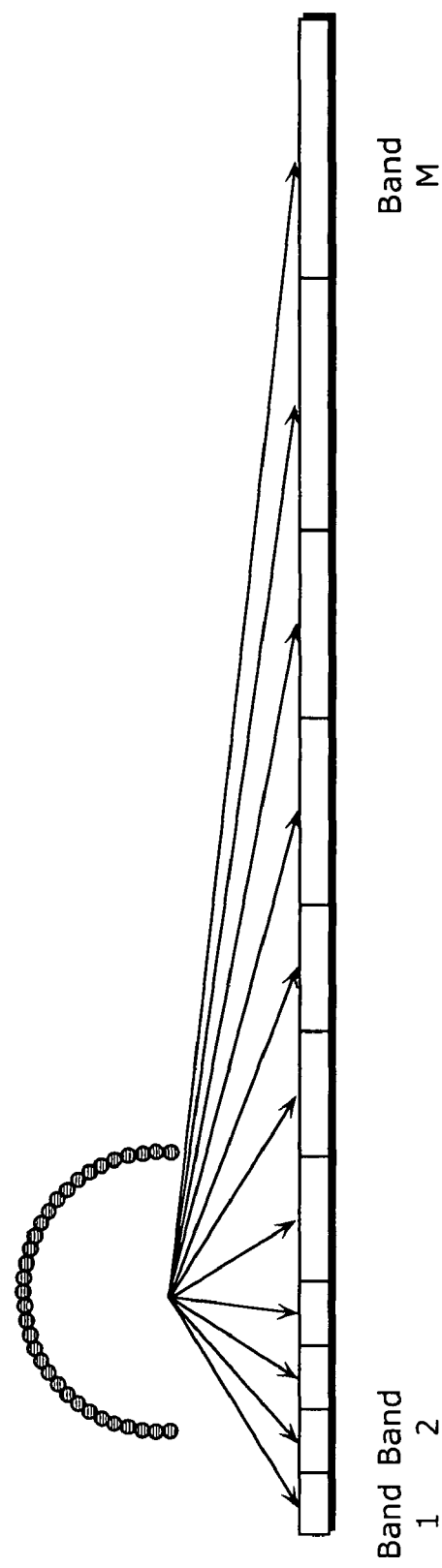
FIG. 6A is a diagram which shows a quantization precision in the conventional art and FIG. 6B is a diagram which shows a quantization precision in the present invention.

Specifically, as shown in FIG. 6A, quantization is performed in each frequency band at the same quantization precision (for example, the value of 32 is applied for quantizing a phase angle), in the conventional art.

Figure 6B:
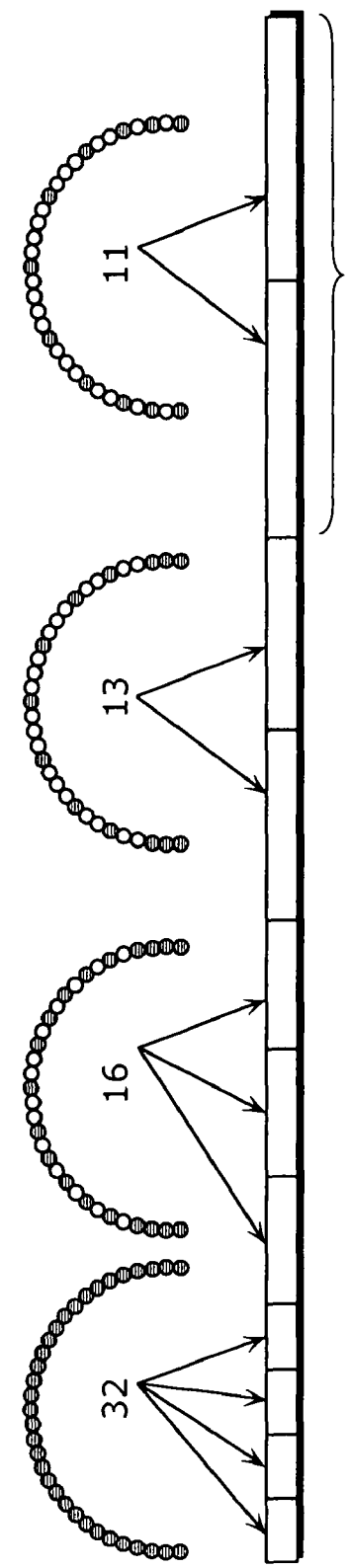

In contrast, as shown in FIG. 6B, the present invention can change the quantization precision for a level ratio and a phase difference, in accordance with a band. For example, the value of 32 is assigned to lower bands, 16 is assigned to the subsequent bands, and 13 and 11 are respectively assigned to bands higher than the subsequent bands.

Accordingly, the audio signal can be encoded in high sound quality with lower bit rate, by quantizing the inter-channel phase difference information and the level difference information at a precision which is different for each frequency band.

Note that in the high frequency bands, adjacent bands may be grouped into one and encoded, for example, the value 120 of 11×11 may be encoded by a stride of 7 bits in other words, by 3.5 bits per band. Consequently, the number of bits to be quantized can be reduced.

Second Embodiment

Hereinafter, the auxiliary information generation unit according to the second embodiment of the present invention is described with reference to the drawings.

Figure 7:
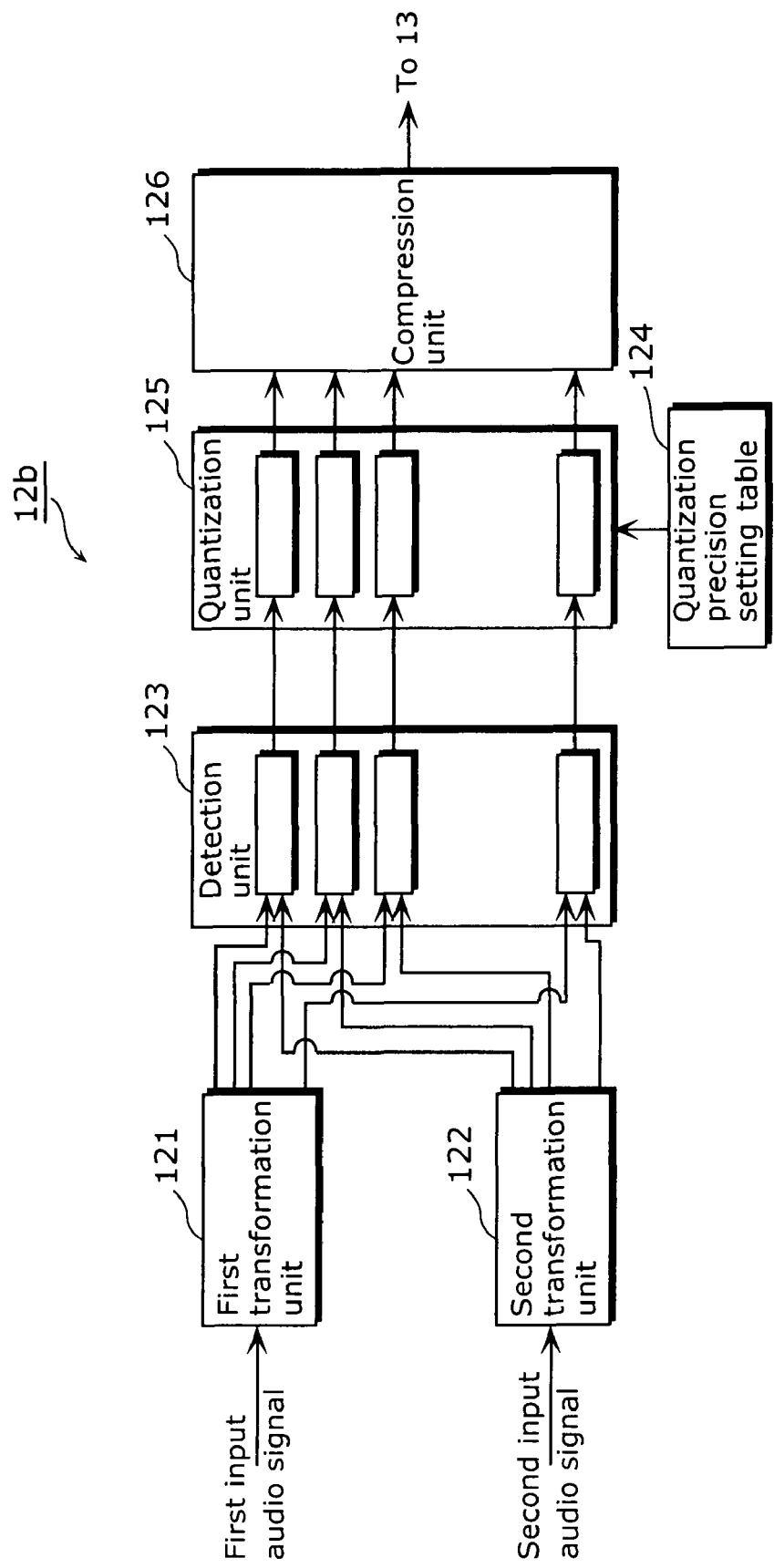
FIG. 7 is a block diagram which shows an other example of a detailed configuration of the auxiliary information generation unit according to the second embodiment.

FIG. 7 is a block diagram showing another example of a detailed structure of the auxiliary information generation unit according to the second embodiment. Here, same reference numbers are used for the constituent elements corresponding to the constituent elements of the auxiliary information generation unit 12a shown in FIG. 4, and the explanation about the same constituent elements is omitted.

As shown in FIG. 7, the auxiliary information generation unit 12b further includes a compression unit 126 in addition to the constituent elements of the auxiliary information generation unit 12 which are the first transformation unit 121, the second transformation unit 122, the detection unit 123, the quantization precision setting table 124, and the quantization unit 125.

Specifically, the second embodiment is different from the first embodiment in that the compression unit 126, which receives quantized values obtained by quantizing the degree of difference for each frequency band by the quantization unit 125 and further performs lossless compression on the quantized values, is included. Here, lossless compression performed by the compression unit 126 is a lossless compression method for allowing the extracted original data to be reconstructed from the compressed data without causing degradation.

This lossless compression for example is a method of compressing each quantized value using Huffman coding.

The lossless compression may be a differential coding method. Specifically, a difference signal is calculated between the quantized value corresponding to the lowest frequency band and the quantized value corresponding to a following frequency band adjacent to the lowest frequency band, and the calculated differential signal is used as a compressed signal. This lossless compression utilizes the characteristics that the quantized values do not have a significant difference between adjacent frequency bands. Here, the difference signal may be further compressed by Huffman coding.

In the case where the quantized values are identical between the adjacent frequency bands, the number of bits may be reduced by performing run-length coding for indicating how many consecutive times that quantized values are identical. Here, the run-length code may be further compressed by Huffman coding.

The number of bits may be further reduced by encoding the base-A number of B digits of adjacent B quantized values that are quantized by A.

For example, in the case where three adjacent quantized values quantized by the value 5 are expressed by quinary number of three digits, the maximum available number is 124. This is based on the equation of 4*25+4*5+4=124 where three quantization values are all maximum number of 4. On the other hand, 124 can be expressed by binary number of seven digits so that adjacent three quantized values, which are quantized by the value 5, can be compressed in seven bits. Generally speaking, the amount of information which equals to three bits is necessary for expressing the value 5 so that nine bits are required in total. Consequently, the amount of information which equals to two bits can be reduced for the three quantized values.

Specifically, the detection unit 123 detects a phase difference between the frequency signals corresponding to the input audio signals; the quantization unit 125 quantizes the detected phase difference by the value 5; the compression unit 126 can compress the amount of information by integrally compressing at least two quantized values. Here, it is not necessary for the quantization unit 125 to perform quantization at the quantization level obtained by equally dividing the phase difference by five. The quantization is desired to be performed on the phase difference to be coarser near the phase difference 90° and finer near the phase difference 0° according to the auditory characteristics.

Similarly, the detection unit 123 detects the phase difference between the frequency signals corresponding to the input audio signals; the quantization unit 125 quantizes the detected phase difference by the value 3; the compression unit 126 can compress the amount of information by uniformly compressing at least three such quantized values. Here, the quantization unit 125 does not need to equally divide the phase difference by three. The quantization is desired to be performed on the phase difference to be coarser near the phase difference 90° and finer near the phase difference 0° according to the auditory characteristics.

Similarly, the detection unit 123 detects the phase difference between the frequency signals corresponding to the input audio signals; the quantization unit 125 quantizes the detected phase difference by the value 11; the compression unit 126 can compress the amount of information by uniformly compressing at least two such quantized values. Here, the quantization unit 125 does not need to equally divide the phase difference by eleven. The quantization is desired to be performed on the phase difference to be coarser near the phase difference 90° and finer near the phase difference 0° according to the auditory characteristics.

As described in the above, in the second embodiment, the compression unit 126 performs lossless compression on the quantized values so that audio signals can be encoded at lower bit rate and with higher sound quality.

Third Embodiment

Hereinafter, the auxiliary information generation unit according to the third embodiment of the present invention is described with reference to the drawings.

Figure 8:
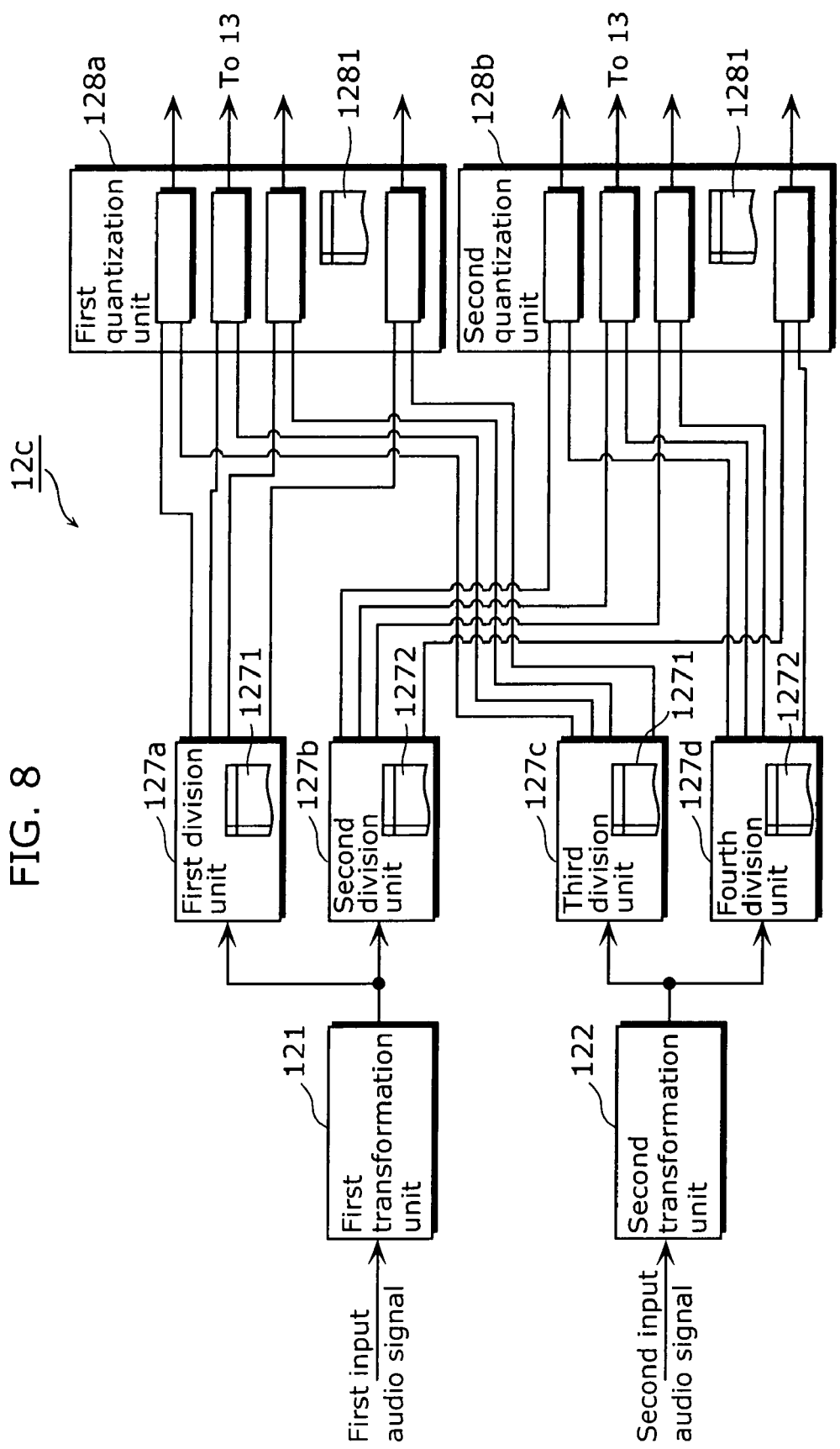
FIG. 8 is a block diagram which shows an other example of a detailed configuration of the auxiliary information generation unit according to the third embodiment.

FIG. 8 is a block diagram showing an other example of a detailed structure of the auxiliary information generation unit according to the third embodiment. Here, same reference numbers are used for the constituent elements corresponding to the constituent elements of the auxiliary information generation unit 12a shown in FIG. 4, and the explanation about the same constituent elements is omitted.

As shown in FIG. 8, the auxiliary information generation unit 12c includes a first transformation unit 121, a second transformation unit 122, a first division unit 127a, a second division unit 127b, a third division unit 127c, a fourth division unit 127d, a first quantization unit 128a, and a second quantization unit 128b.

The first transformation unit 121 transforms a first input audio signal into a frequency band signal.

The second transformation unit 122 transforms a second input audio signal into a frequency band signal.

The first division unit 127a has a frequency division table 1271 regarding gain ratio information, and divides the frequency band signal generated by the first transformation unit 121 for each of the plural frequency bands.

The second division unit 127b has a frequency division table 1272 regarding phase difference information, and divides the frequency band signal generated by the first transformation unit 121 using a different division method than that of the first division unit 127a.

The third division unit 127c has a frequency division table 1271 regarding gain ratio information, and divides the frequency band signal generated by the second transformation unit 122 using the same division method as that of the first division unit 127a.

The fourth division unit 127d has a frequency division table 1272 regarding phase difference information, and divides the frequency band signal generated by the second transformation unit 122 using the same division method as that of the second division unit 127b.

The first quantization unit 128a has a quantization precision table 1281 in which quantization precision for the gain ratio information and quantization precision for the phase difference information are separately determined, detects a gain ratio between the frequency band signal divided by the first division unit 127a and the frequency band signal divided by the third division unit 127c, for each divided frequency band, and quantizes the detected gain ratio.

The second quantization unit 128b has a quantization precision table 1281, and detects a phase difference between the frequency band signal divided by the second division unit 127b and the frequency band signal divided by the fourth division unit 127d, for each divided frequency band, and quantizes the detected phase difference.

Hereinafter, the operations of the auxiliary information generation unit 12c shall be described.

First, the first transformation unit 121 transforms the first input audio signal into a frequency band signal. This is, for example, the transformation of the input audio signal into a frequency spectral signal using a Fourier transformation or the like. In the third embodiment, it is assumed that the input audio signal is transformed into 1024 complex Fourier series.

On the other hand, the second transformation unit 122 transforms the second input audio signal into a frequency band signal. The method of this transformation is the same as in the first transformation unit 121.

Next, the first division unit 127a divides the frequency band signal generated by the first transformation unit 121, for each of the plural frequency bands. Here, the method of division is compliant with the table shown as FIG. 9.

FIG. 9 is a diagram showing a detailed structure of the frequency division table 1271.

In FIG. 9, the left column indicates numbers of respective bands, the central column indicates the starting frequencies of frequency bands of the respective band numbers, and the right column indicates the end frequencies of the frequency bands of the respective band numbers. Specifically, the first division unit 127a divides, for each frequency band, the frequency band signal (1024 complex Fourier series) generated by the first transformation unit 121, according to the table of FIG. 9.

Similarly, the second division unit 127b divides, for each of the plural frequency bands, the frequency band signal generated by the first transformation unit 121. Here, the method of division is compliant with the table shown as FIG. 10.

FIG. 10 is a diagram which shows a detailed configuration of the frequency division table 1272.

FIG. 10 and FIG. 9 are similar but they have different methods of assigning specific bands. In the third embodiment, it has been explained that, as an example, the bands of high frequencies are more coarsely divided than in the case of FIG. 9. In accordance with the table shown in FIG. 10, the second division unit 127b divides, for each frequency band, the frequency band signal (1024 complex Fourier series) generated by the first transformation unit 121. As an example, the stride of division in the higher frequency bands is more coarsely divided in the third embodiment. However, the stride of division is not necessarily to be set coarse, but stride for frequencies of low auditory sensitivity may be selectively set coarse.

The third division unit 127c divides the frequency band signal generated by the second transformation unit 122 for each of the plural frequency bands, and its operation is the same as that of the first division unit 127a.

The fourth division unit 127d divides the frequency domain signal generated by the second transformation unit 122 for each of the plural frequency bands, and its operation is the same as that of the second division unit 127b.

Next, the first quantization unit 128a detects and quantizes a gain ratio between the frequency band signal divided by the first division unit 127a and the frequency band signal divided by the third division unit 127c, for each frequency band.

Here, the method of detecting the gain ratio may be a method of comparing maximum values of amplitudes, and of comparing energy levels, for respective bands, or any other methods. The detected gain ratio is quantized by the first quantization unit 128*a*.

Next, the second quantization unit 128*b* detects and quantizes the phase difference between the frequency band signal divided by the second division unit 127*b* and the frequency band signal divided by the fourth division unit 127*d*, for each corresponding frequency band.

Here, the method of detecting the phase difference may be a method of obtaining a phase angle from representative values of real number values and imaginary number values of Fourier series, in the frequency band, or any other methods. The detected phase difference is quantized by the second quantization unit 128*b*.

It should be noted that the first division unit 127*a* and the third division unit 127*c* respectively divide, for each frequency band, a frequency signal of the first input audio signal and a frequency signal of the second input audio signal by the method of division shown on the table of FIG. 9, so that frequencies are finely divided relatively up to high frequency bands.

In contrast, the second division unit 127*b* and the fourth division unit 127*d* respectively divide the frequency signal of the first input audio signal and the frequency signal of the second input audio signal by the methods of division shown on the table of FIG. 10, so that frequencies are coarsely divided for higher frequency bands.

As a result, gain ratio information is detected and quantized, for each frequency band, finely for up to relatively high frequency bands, and phase difference information is coarsely detected and quantized for higher frequency bands. In consideration with the auditory characteristics that phase information cannot be precisely detected for high frequency band signals, auditory degradation of sound quality is minimized and the amount of information can be reduced.

Whereas, in order to simplify the explanation, it has been described that the method of frequency signal division is previously determined by the table, it is obvious that its determination is not required. In other words, the method of frequency signal division may be determined in accordance with an input signal when necessary, and information indicating the division method may be also encoded.

In that case, the above-identified division method may be performed as follows. In other words, the frequency band is divided into groups of desired strides, each stride being sequentially determined in ascending order of frequencies based on the number of signals included in each group.

Lastly, a bit stream is constructed by formatting the quantized gain ratio information and phase difference information under a predetermined rule. Here, any methods can be used.

As described in the above, in the third embodiment, the amount of information can be reduced while decreasing the auditory degradation in sound quality, by quantizing the phase difference information using a frequency division for dividing frequencies coarsely than the frequency division used for the gain ratio information.

Note that, the amount of information in the phase difference information is reduced by coarsely dividing the frequencies in the third embodiment. The method of reducing the amount of information of phase difference information includes, for example, a method of setting the quantization precision for the phase difference information for each frequency band to be coarser than the quantization precision for the gain ratio information.

For example, as shown in FIG. 11, the quantization precision for the phase difference information is set to be more coarser than the quantization precision for the gain ratio information. This is based on the characteristics that auditory sensitivity of the phase difference information is less responsive than the auditory sensitivity of the gain ratio information. Note that, values shown in FIG. 11 are just examples and may be set adaptively according to a sampling frequency and a bit rate. With respect to quantization, the number of bits used for the phase difference information is set to be less than the number of bits used for the gain ratio information. Consequently, a high compression can be realized while minimizing the degradation in sound quality on the auditory sensitivity.

Furthermore, whereas, in the third embodiment, frequencies with respect to the gain ratio information are divided based on FIG. 9 and frequencies with respect to the phase difference information are divided based on FIG. 10, the frequencies with respect to the gain ratio information may be divided based on FIG. 12 and the frequencies with respect to the phase difference information may be divided based on FIG. 13.

Comparing FIG. 9 and FIG. 12, the frequencies are more coarsely divided in FIG. 12 than in FIG. 9, and comparing FIG. 10 and FIG. 13, the frequencies are more coarsely divided in FIG. 13 than in FIG. 10. Accordingly, the amount of information at the time of quantization can be reduced by selecting the tables shown as FIG. 12 and FIG. 13 as tables for determining division methods. In the case of an encoder having operation modes of plural bit rates, it is only necessary to change the division method of frequencies when the encoder operates at a low bit rate. In this case, the quantization precision table 1281 may be used in accordance with band numbers or a quantization table for a lower bit rate than the quantization precision table 1281 may be prepared.

Here, characteristics of the present invention are described.

Figure 14A:
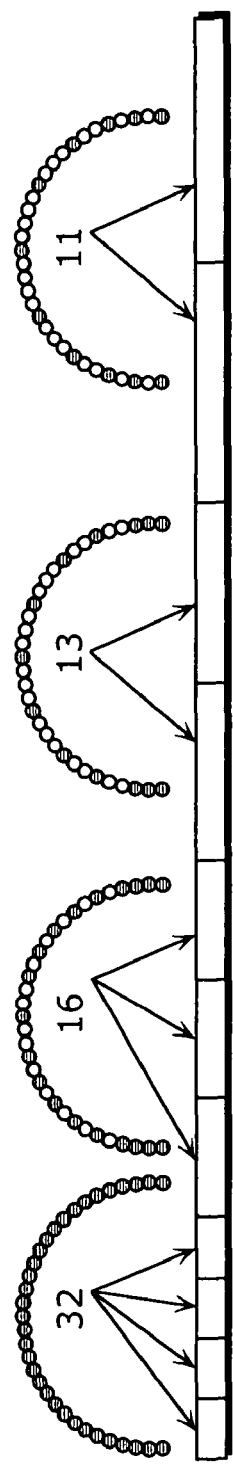
FIG. 14A and FIG. 14B are diagrams which show a comparison between quantization precisions at high bit rate and a low bit rate.
Figure 14B:
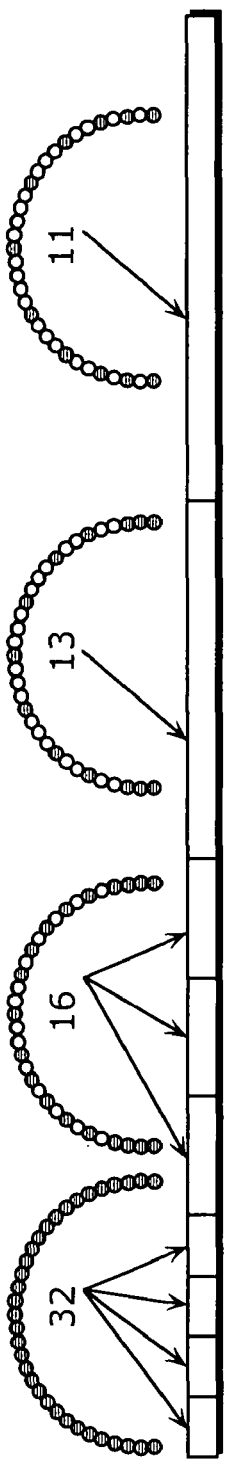

As shown in FIG. 14A and FIG. 14B, a method for band division is changed in accordance with a bit rate. Accordingly, lower bit rate can be realized while reducing degradation in sound quality.

Figure 14C:
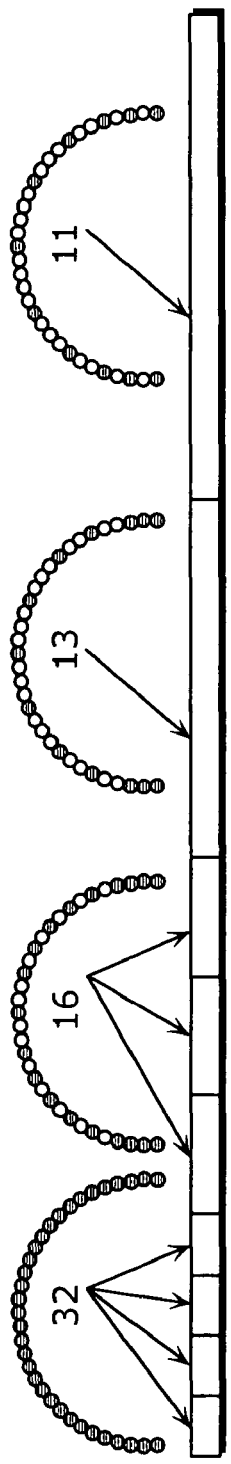
FIG. 14C and FIG. 14D are diagrams which show a comparison between quantization precisions for phase difference information and gain ratio information.
Figure 14D:

Furthermore, as shown in FIG. 14C and FIG. 14D, the phase difference information is encoded by being divided more coarsely than in the case of the gain difference information. Here, the phase difference information is quantized at a quantization precision which is coarser than that of the gain difference information.

Accordingly, lower bit rate can be realized while reducing degradation in sound quality.

In order to simplify the explanation, it has been described that a division method is previously determined in a table as an example of existing methods for dividing frequency signals coarsely and finely. However, it is obvious that the method is not necessarily to be previously determined. For example, in the case where the frequency band is divided into groups of desired strides so that each stride is sequentially determined in ascending order of frequencies based on the number of signals included in each group. The frequency band may be divided coarsely by setting the stride value as large and may be divided finely by setting the stride value as small.

Furthermore, whereas two channel input audio signals are applied in the second embodiment, multiple-channels input audio signals of two or more channels may be also applied.

For example, multiple-channel signals of 5.1 channels include audio signals of 5 channels from the front center "Center", front right "FR", front left "FL", back right "BR", and back left "BL" of the viewer, and a 0.1 channel signal "LFE" which indicates a very low frequency level of the audio signal. In this case, the downmixed signal encoding unit 11 may generate a downmixed signal DL by downmixing each two signals of the front left "FL", back left "BL", front center "Center", and "LFE", and generate a downmixed signal DR by downmixing each two signals of the front right "FR", back right "BR", front center "Center" and "LFE". Furthermore, the auxiliary information generation unit 12 may detect a level ratio and a phase difference, with respect to the downmixed signal DL, for each two signals of the front "FL", back left "BL", front center "Center", and "LFE", and with respect to the downmixed signal DR, for each two signals of the front right "FR", back right "BR", front center "Center" and "LFE".

INDUSTRIAL APPLICABILITY

The audio encoder of the present invention is an audio encoder which encodes multiple-channel signals, and is particularly capable of expressing the phase difference and the level difference between multiple-channel signals with very small number of bits, so that it is applicable for a device used for a music broadcast service, music distribution service with a low bit rate, mobile devices such as cellular phones, AV devices, and receiving devices of the same.

The invention claimed is:

1. An audio encoder which compresses and encodes audio signals of N channels, where N>1, said audio encoder comprising:
 a downmixed signal encoding unit operable to encode a downmixed signal obtained by downmixing the audio signals; and
 an auxiliary information generation unit operable to generate auxiliary information which is necessary for decoding the downmixed signal encoded by said downmixed signal encoding unit into the audio signals of the N channels,
 wherein said auxiliary information generation unit includes:
 a transformation unit operable to transform one of the audio signals into a first frequency domain signal, and to transform another of the audio signals into a second frequency domain signal;
 a division unit operable to divide a frequency band of each of the first frequency domain signal and the second frequency domain signal into plural sub-bands;
 a detection unit operable to detect phase difference information and gain ratio information that each indicates a degree of difference between the first frequency domain signal and the second frequency domain signal; and
 a quantization unit operable to quantize, for each sub-band, the phase difference information and gain ratio information that are detected by said detection unit.

2. The audio encoder according to claim 1,
 wherein said division unit is operable to divide a frequency band for quantizing the phase difference information and a frequency band for quantizing the gain ratio information, using different methods respectively.

3. The audio encoder according to claim 2,
 wherein the frequency band is divided into groups of desired strides, each stride being sequentially determined in ascending order of frequencies based on the number of signals included in each group.

4. The audio encoder according to claim 3,
 wherein the frequency band is more coarsely divided for quantizing the phase difference information than for quantizing the gain ratio information.

5. The audio encoder according to claim 1,
 wherein said auxiliary information generation unit further includes:

a first table in which a method of dividing a frequency band is determined; and
 a second table in which a method of dividing a frequency band more coarsely than the method determined in the first table is determined,
 wherein said division unit is operable to change a method of dividing a frequency band adaptively, by selecting said first table or said second table.

6. The audio encoder according to claim 5,
 wherein said auxiliary information generation unit further includes
 a bit rate specification unit operable to specify a bit rate, and
 said division unit is operable to change the method of dividing the frequency band, in accordance with the bit rate specified by said bit rate specification unit.

7. The audio encoder according to claim 6,
 wherein said division unit is operable to divide the frequency band in compliance with a condition determined in said first table when the bit rate is high, and to divide the frequency band in compliance with a condition determined in said second table when the bit rate is low.

8. The audio encoder according to claim 1,
 wherein a precision for quantization performed by said quantization unit is determined for each sub-band.

9. The audio encoder according to claim 8,
 wherein the precision for quantization performed by said quantization unit is more finely determined for lower sub-bands.

10. The audio encoder according to claim 8,
 wherein the precision for quantization performed by said quantization unit is determined in accordance with auditory sensitivity characteristics.

11. The audio encoder according to claim 8,
 wherein said auxiliary information generation unit further includes
 a compression unit operable to perform reversible compression on plural quantized values that are quantized by said quantization unit.

12. The audio encoder according to claim 11,
 wherein said compression unit is operable to reduce the number of bits by obtaining a difference between quantized values of adjacent sub-bands.

13. The audio encoder according to claim 11,
 wherein said compression unit is operable to reduce the number of bits, when quantized values between sub-bands are identical, by performing run-length encoding for showing how many consecutive times the quantized values are identical between the sub-bands.

14. The audio encoder according to claim 11,
 wherein said compression unit is operable to reduce the number of bits using a variable length encoding process.

15. The audio encoder according to claim 11,
 wherein said quantization unit is operable to quantize the degree of difference detected by said detection unit, using a quantized value of A levels,
 wherein said compression unit is operable to integrally compress B quantized values, and
 wherein A is a natural number and B is a natural number.

16. The audio encoder according to claim 15,
 wherein B is determined previously in accordance with A.

17. The audio encoder according to claim 16,
 wherein B has a digit of P which is a binary number of A, and is a value having Q which is smaller than P*B, where Q is a digit of dual number of A having B digit, and
 wherein P is a natural number and Q is a natural number.

18. The audio encoder according to claim 1,
wherein said quantization unit is operable to quantize the phase difference information with the number of bits that is smaller than the number of bits necessary for quantizing the gain ratio information.

19. A coding method for compressing and encoding audio signals of N channels, where N>1, said method comprising:
a downmixed signal encoding step of encoding a downmixed signal obtained by downmixing the audio signals; and
an auxiliary information generation step of generating auxiliary information which is necessary for decoding the downmixed signal encoded in said downmixed signal encoding step into the audio signals of the N channels,
wherein said auxiliary information generation step includes:
a transformation step of transforming one of the audio signals into a first frequency domain signal, and transforming another of the audio signals into a second frequency domain signal;
a division step of dividing a frequency band of each of the first frequency domain signal and the second frequency domain signal into plural sub-bands;
a detection step of detecting phase difference information and gain ratio information that each indicates a degree of difference between the first frequency domain signal and the second frequency domain signal; and
a quantization step of quantizing, for each sub-band, the phase difference information and gain ratio information that are detected in said detection step.

20. A non-transitory computer-readable storage medium having a program embodied thereon for causing a computer to execute the steps included in the coding method according to claim 19.

21. An LSI (Large Scale Integrated) circuit designed for an audio encoder which compresses and encodes audio signals of N-channels, where N>1, said LSI circuit comprising:
a downmixed signal encoding unit operable to encode a downmixed signal obtained by downmixing the audio signals; and
an auxiliary information generation unit operable to generate auxiliary information which is necessary for decoding the downmixed signal encoded by said downmixed signal encoding unit into the audio signals of the N channels,
wherein said auxiliary information generation unit includes:
a transformation unit operable to transform one of the audio signals into a first frequency domain signal, and to transform another of the audio signals into a second frequency domain signal;
a division unit operable to divide a frequency band of each of the first frequency domain signal and the second frequency domain signal into plural sub-bands;
a detection unit operable to detect phase difference information and gain ratio information that each indicates a degree of difference between the first frequency domain signal and the second frequency domain signal; and
a quantization unit operable to quantize, for each sub-band, the phase difference information and gain ratio information that are detected by said detection unit.

* * * * *